(12) United States Patent
Boyd

(10) Patent No.: US 7,209,618 B2
(45) Date of Patent: Apr. 24, 2007

(54) SCANNER TRANSPARENT MEDIA ADAPTER USING FIBER OPTIC FACE PLATE

(75) Inventor: David W. Boyd, Greeley, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 426 days.

(21) Appl. No.: 10/397,812

(22) Filed: Mar. 25, 2003

(65) Prior Publication Data

US 2004/0190844 A1 Sep. 30, 2004

(51) Int. Cl.
G02B 6/04 (2006.01)
G02B 6/00 (2006.01)

(52) U.S. Cl. ....................... 385/120; 385/116

(58) Field of Classification Search ............ 385/15, 385/31, 120, 147; 349/196, 197; 250/227.14, 250/227.2; 382/315, 488; 358/496, 497, 358/508, 214
See application file for complete search history.

(56) References Cited

U.S. PATENT DOCUMENTS

| | | | | |
|---|---|---|---|---|
| 2,976,447 A | * | 3/1961 | McNaney | 313/390 |
| 3,824,535 A | * | 7/1974 | Rover, Jr. | 340/980 |
| 5,256,868 A | | 10/1993 | Kaplan et al. | |
| 5,472,759 A | * | 12/1995 | Chen et al. | 428/65.1 |
| 5,726,730 A | * | 3/1998 | Crawford et al. | 349/196 |
| 5,917,195 A | * | 6/1999 | Brown | 257/22 |
| 5,933,550 A | * | 8/1999 | Fujieda et al. | 382/314 |
| 6,094,512 A | * | 7/2000 | Lin et al. | 382/315 |
| 6,885,439 B2 | * | 4/2005 | Fujieda | 356/71 |
| 2002/0057720 A1 | * | 5/2002 | Nomura et al. | 372/18 |
| 2003/0016405 A1 | * | 1/2003 | Tecu et al. | 358/506 |

FOREIGN PATENT DOCUMENTS

| | | | |
|---|---|---|---|
| EP | 0559433 A1 | * 9/1993 | |
| EP | 1003323 | 5/2000 | |
| EP | 0495199 A2 | * 7/2002 | 385/12 |

OTHER PUBLICATIONS http://www.om.tu-harburg.de/Lehre/Vorlesungen/FIBERS%20AND%20INTEGRATED%20OPTICS/Online/08%20Fiber%20Optic%20Devices/11%20Fiber%20Face%20Plate.pdf, printed on Mar. 24, 2003, 1 page.
Modern Optical Engineering: The Design of Optical Systems, Second Edition, Warren J. Smith, ISBN 0-07-059174-1, pp. 265-268.
Hamamatsu Photonics K.K. Electoron Tube Center, "Fiber Optic Plates", "Creating New Optical Design," TMCP1005E02, Oct. 1998 IP (9309), 3 pages.

* cited by examiner

*Primary Examiner*—Sung Pak
(74) *Attorney, Agent, or Firm*—David W. Boyd

(57) ABSTRACT

A transparent media adapter for scanning transmissive media on a flatbed scanner comprises a fiber optic face plate. The fiber optic face plate translates the image from the media to the scanner focal plane.

7 Claims, 5 Drawing Sheets

SCANNER TRANSPARENT MEDIA ADAPTER USING FIBER OPTIC FACE PLATE

FIELD OF THE INVENTION

The present invention relates generally to scanning of transmissive imaging media such as photographic slides and negatives.

BACKGROUND OF THE INVENTION

Many modern flatbed document scanners provide means for scanning transmissive media such as photographic slides or negatives. Transmissive media are sometimes called transparent media, or transparencies. Typically, a transmissive original is placed on or near the scanner platen, and light is directed through the media to be sensed by the imaging system below. A system or device for holding the media and providing the backlight to the media is sometimes called a transparent media adapter.

FIG. 1 shows a typical arrangement in cross section. A 35 millimeter slide 101 is cradled in positioning template 102, which rests on the scanner platen 103. Light source 104 directs light 106 downward through the slide 101 and platen 103, where some of the light is collected by an optical system in an imaging module 105. Often, the scanner is designed to create an in-focus image of an original placed on the platen.

Imaging module 105 may be a contact image sensor (CIS) module. FIG. 2 shows a schematic view of some components of a typical CIS module placed below scanner platen 103. Some parts such as supporting structures have been omitted for clarity. An array of gradient index rod lenses 201 is positioned just below the scanner platen 103. A set of light sensing elements 202 is placed below the array of gradient index rod lenses 201. The light sensing elements 202 are fixed on a circuit board 203, and electrical signals travel from the light sensing elements 203 to other electronics (not shown) through cable 204. Typically, a light source 205 is used to illuminate reflective originals, such as paper documents, that are placed on the scanner platen 103 for scanning. The light source 205 is typically not used when scanning transmissive originals. The CIS module is typically moved by a transport mechanism (not shown) to enable scanning of an area of the scanner platen 103.

FIG. 3 shows the CIS module of FIG. 2 in cross section view. Gradient index rod lenses 201 project an image from an image plane substantially at the surface of the scanner platen 103 onto light sensitive elements 202.

Typically, an imaging module 105 has a limited depth of field. That is, objects placed at the nominal image plane will image sharply onto the scanner's image sensors, but objects displaced significantly from the nominal image plane will appear out of focus in the resulting image. The range of object positions that will result in images of acceptable sharpness is called the scanner's depth of field. A scanner utilizing a CIS module for its imaging apparatus may have a depth of field of 0.5 millimeters or less.

The image, or focal, plane of the scanner may be nominally adjusted to be just above the platen surface in order to fully utilize the scanner's depth of field in the space above the platen where originals or objects can be. However, because the scanner's depth of field is so limited, the focal plane may still be considered to be substantially at the platen surface.

FIG. 4 illustrates some variable dimensions of the transmissive media holding system of FIG. 1. By virtue of the height of the positioning template 102 and the thickness T of the carrier of slide 101, the film portion of slide 101 is held a distance D above the scanner platen 103. Because the scanner is likely designed to focus near the top of the platen 103, slide 101 will be out of focus. Even if slide 101 were placed directly on the platen 103, the film portion would be held a distance away from the scanner's focal plane by virtue of carrier thickness T.

Furthermore, the thickness T of the carrier of slide 101 varies significantly from slide to slide. Some commercially available slide carriers are as thin as 1.2 millimeters, while others are as thick as 3.0 millimeters. Even if the scanner could be configured to focus a distance above platen 103 in an attempt to focus on the film of slide 101, the variability in thickness T imparts enough variability in distance D to carry some slides out of the depth of field of the scanner.

What is needed is a means for scanning, with adequate sharpness, transmissive media on a scanner with limited depth of field.

SUMMARY OF THE INVENTION

A transparent media adapter for scanning transmissive media on a flatbed scanner comprises a fiber optic face plate. The fiber optic face plate translates the image from the media to the scanner focal plane.

DETAILED DESCRIPTION OF THE PREFERRED EMBODIMENT

Figure 1:
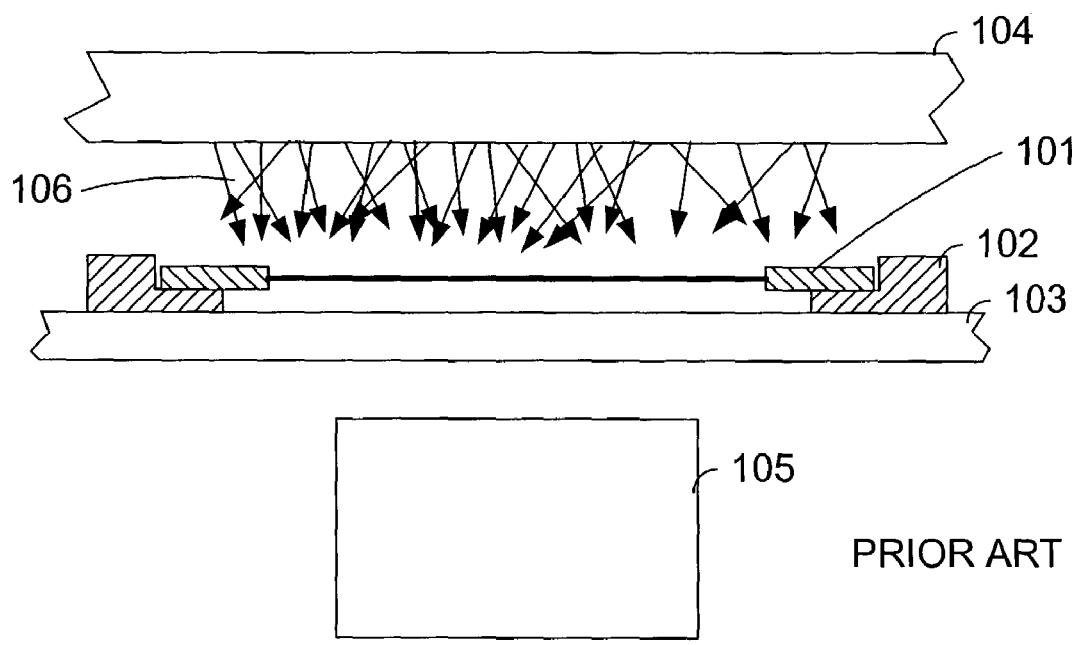
FIG. 1 shows a typical transparent media adapter arrangement in cross section.
Figure 2:
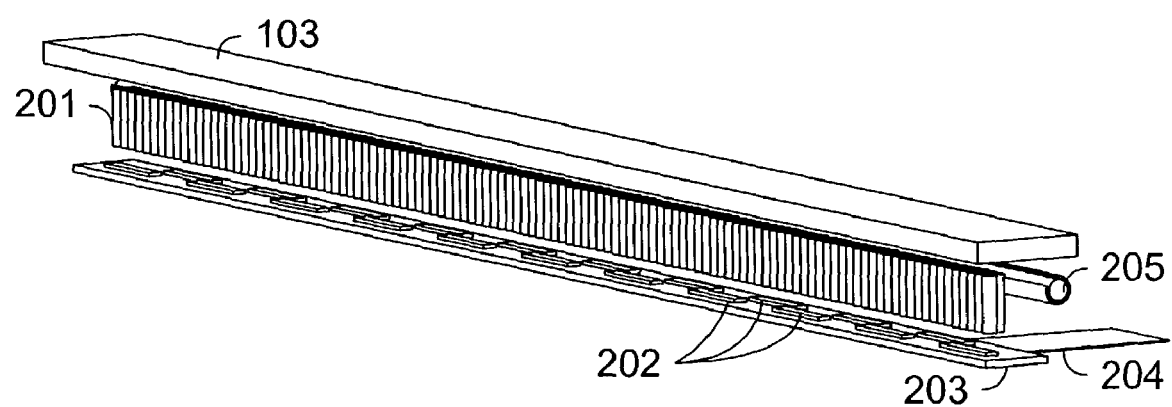
FIG. 2 shows a schematic view of some components of a typical contact image sensor (CIS) module placed below a scanner platen.
Figure 3:
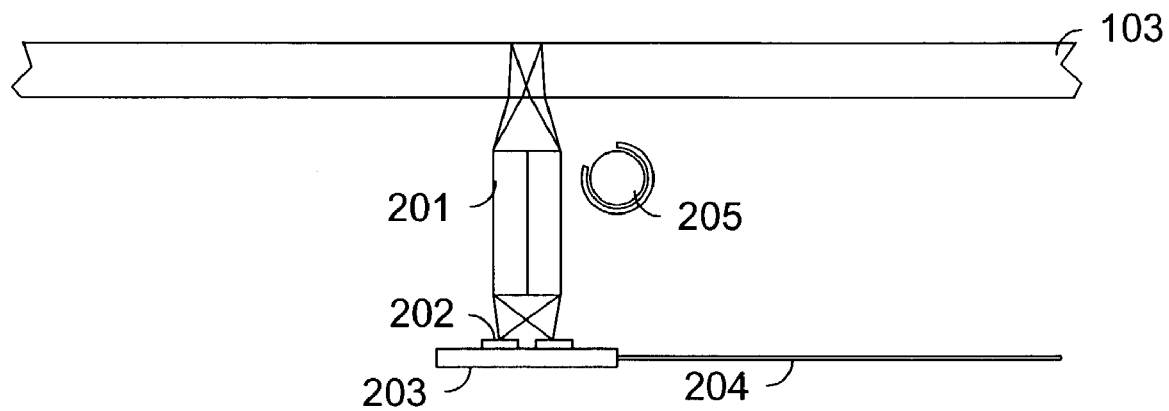
FIG. 3 shows the CIS module of FIG. 2 in cross section view.
Figure 4:
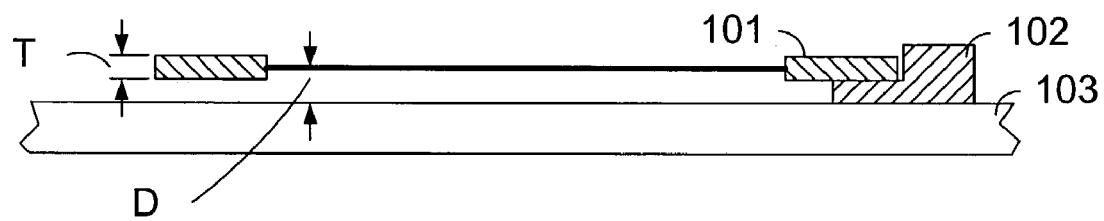
FIG. 4 illustrates some variable dimensions of the transmissive media holding system of FIG. 1.
Figure 5:
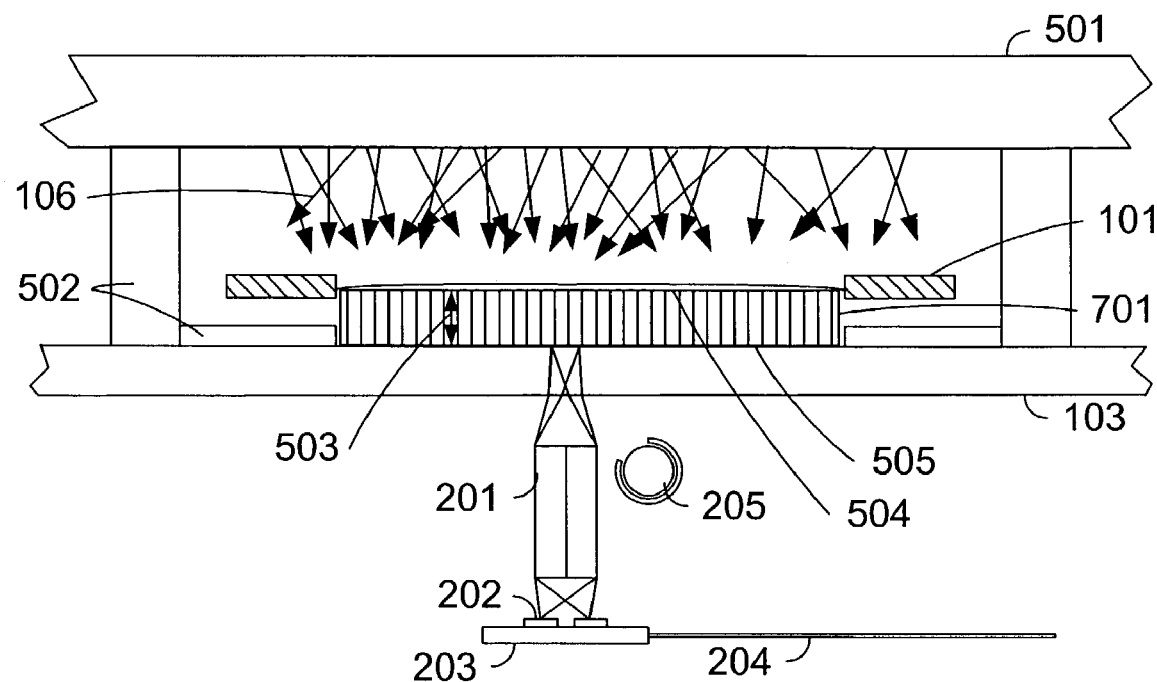
FIG. 5 depicts a scanner transparent media adapter in accordance with an example embodiment of the invention, placed on a scanner platen.

FIG. 5 depicts a scanner transparent media adapter in accordance with an example embodiment of the invention, placed on a scanner platen. Light source 501 provides backlight illumination of slide 101. Light source 501 may be of a typical kind wherein a surface emanates substantially uniform diffuse light. Slide 101 is supported by and is in substantial contact with fiber optic face plate 701. The length and width of fiber optic face plate 701 are such that it will fit inside the viewable area of slide 101, but substantially encompass the viewable area. By virtue of the close proximity of slide 101 to the upper, or entrance, face 504 of fiber optic face plate 701 and the limited acceptance angle of the fibers making up fiber optic face plate 701, an image of slide 101 is projected into the upper face of fiber optic face plate 701. Fiber optic face plate 701 spatially samples the image and transports it to its lower, or exit, face 505, where the spatially sampled image emerges.

Figure 6:
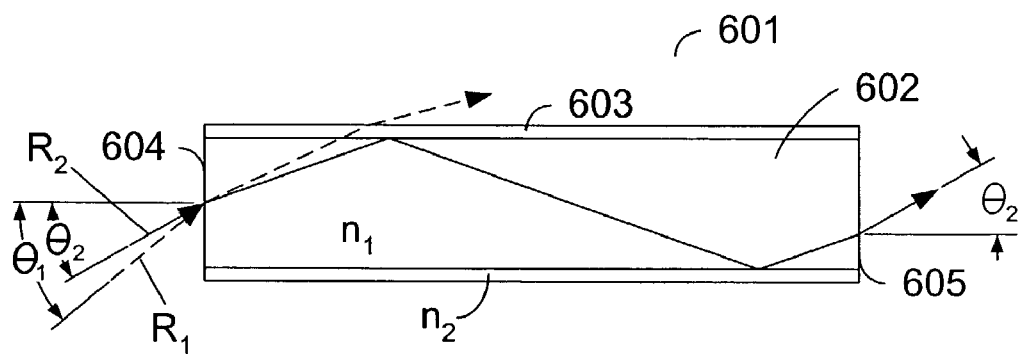
FIG. 6 demonstrates total internal reflection (TIR) in an optical fiber.

A fiber optic face plate, also sometimes called a fiber optic plate, is an ordered bundle of optical fibers, and operates using the principle of total internal reflection. FIG. 6 demonstrates total internal reflection (TIR) in an optical fiber. Fiber 601 is a cylinder, shown in cross section. Core section 602 is made of a substantially transparent material such as glass or an optical plastic, having an index of refraction $n_1$. Cladding layer 603 is made of a second material having an index of refraction $n_2$, $n_2$ being lower than $n_1$. A light ray $R_1$ entering face 604 of the fiber at a high angle of incidence $\theta_1$ will refract into the fiber and back out by refraction through the cladding layer into the surrounding material, if the surrounding material also has a sufficiently high index of refraction. However, a light ray $R_2$ entering face 604 at a lower angle of incidence $\theta_2$ will refract into the fiber in a similar way, but encounters the cladding layer at an angle of incidence sufficiently high that it cannot refract into the cladding layer 603. Instead, it reflects away from the interface between the core layer 602 and the cladding layer 603. Once ray $R_2$ is accepted into the fiber in this way, it continues to propagate along the fiber by successive internal reflections until it exits the fiber at face 605.

The maximum angle of incidence with face 604 that results in total internal reflection from the cladding layer is called the acceptance angle of the fiber, and depends on the indices of refraction $n_1$ and $n_2$. Light entering face 604 at less than the acceptance angle will emerge from face 605, diverging at substantially the same angle at which it entered face 604. However, such light will have been transported along the length of fiber 601 without additional divergence. Spatial relationships between rays entering fiber 601 are not necessarily preserved upon exit from the fiber. For example, two rays exactly parallel to each other may enter face 604, but exit face 605 unparallel with each other. However, all of the rays will necessarily be within the acceptance angle of the fiber, both on entry into and exit from the fiber.

Figure 7:
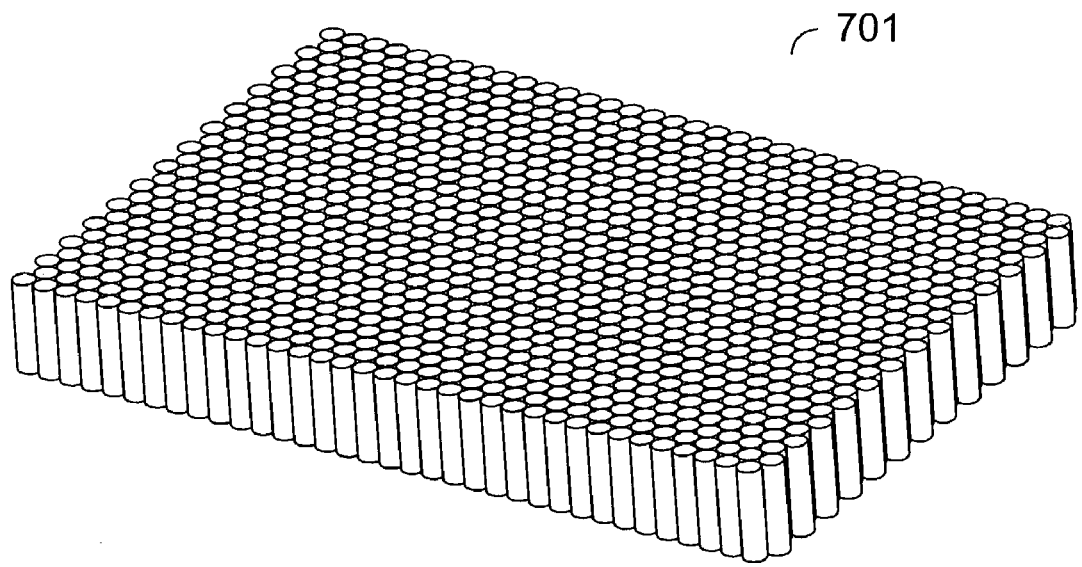
FIG. 7 depicts a fiber optic face plate.

Many optical fibers may be collected into an ordered array, forming fiber optic face plate 701 as shown in FIG. 7. The interstices between fibers in fiber optic face plate 701 may be filled with an optically absorbing material. The absorbing material captures high-incident-angle rays that may escape the cladding layer of particular fibers, thus reducing the possibility of "crosstalk" resulting from light leakage between fibers.

Because each fiber accepts light at an entrance face and transports the light to an exit face, fiber optic face plate 701 has the property that an image projected onto one face will appear to emerge from the other face, spatially sampled at a resolution corresponding to the spacing of the fibers. For example, if the individual fibers are spaced 7 micrometers from fiber center to fiber center, the image emerging from the exit face will be sampled with a resolution of about 7 micrometers, or about 3,628 samples per inch. Because this spatial sampling density is well above the ability of many flatbed scanners to resolve detail, the sampling inherent in the operation of fiber optic face plate 701 will have a negligible effect on the quality of any images scanned after passing through fiber optic face plate 701. Fiber optic face plates are commercially available with fiber diameters ranging from about 3 micrometers to about 25 micrometers or more. While only a few fibers are depicted in FIG. 7 for simplicity of visualization, an actual fiber optic face plate may have millions of fibers.

The lower, or exit, face of fiber optic face plate 701 rests on scanner platen 103, so that the image emerging from fiber optic face plate 701 is at or near the focal plane of the scanner's imaging module. The scanner can then scan the image normally. The entrance face 504 of fiber optic face plate 701 is simply the face at which light enters, and the exit face 505 is the face at which light exits. There need be no difference in optical characteristics of the two faces. Fiber optic face plate 701 may typically be symmetrical, and may work with either face used as the entrance face.

As long as the height 503 of fiber optic face plate 701 is sufficient to raise the carrier of slide 101 away from scanner platen 103, the performance of the system is insensitive to the thickness of the slide carrier, so the problem of slide carrier thickness variation has been solved. In addition, the system presents an in-focus image of the slide to the scanner optical system, allowing a scanner with limited depth of field to perform a satisfactory scan. The performance of the system is essentially insensitive to the thickness 503 of fiber optic face plate 701.

Because slides often exhibit a residual curvature, the user of the system may wish to minimize potential damage to slides placed in the example transparent media adapter by placing the slide onto fiber optic face plate 701 with the concave side of the slide facing fiber optic face plate 701. This condition is illustrated in FIG. 5. The film portion of slide 101 is curved with its concave side facing downward. In this position, most contact with fiber optic face plate 701 will occur at the edges or corners of the viewable area of slide 101, thereby minimizing any potential damage to slide 101. If the curvature of slide 101 is excessive, it may be desirable to provide means for constraining slide 101 in close proximity to fiber optic face plate 701 in order to facilitate the capture of a high resolution image by fiber optic face plate 701.

A transparent media adapter in accordance with an example embodiment of the invention may include alignment features 502 for holding fiber optic face plate 701 in proper position on scanner platen 103, and for holding light source 501 properly above slide 101.

Figure 8:
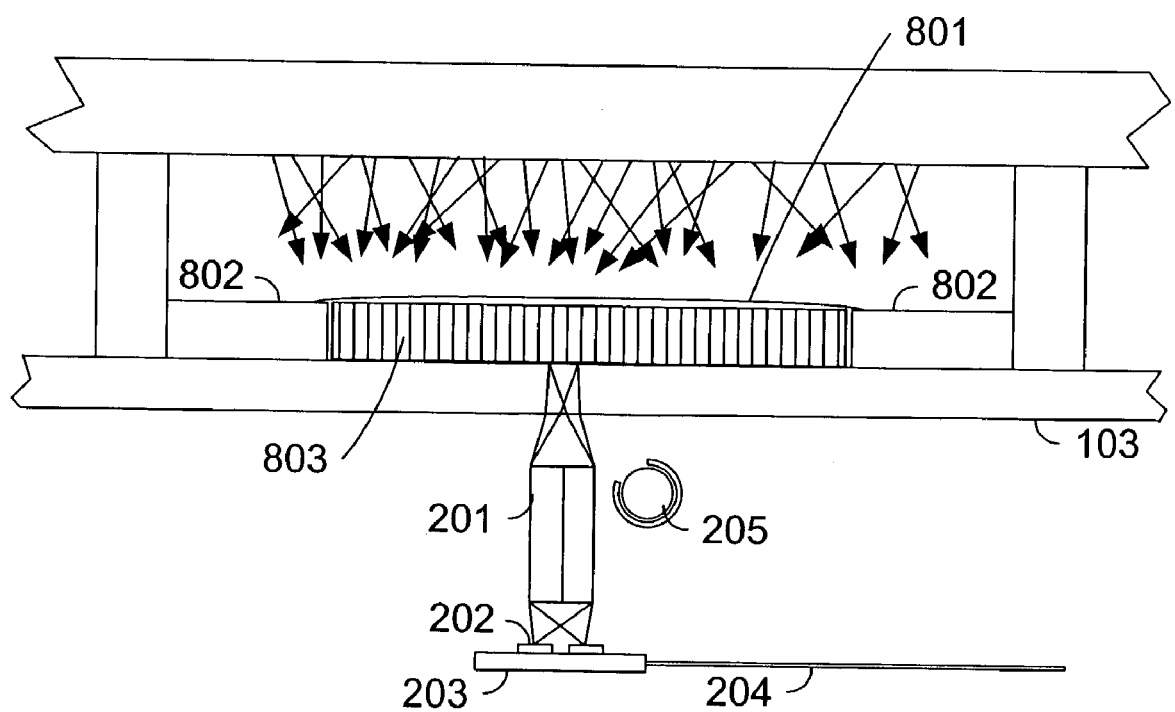
FIG. 8 shows a transparent media adapter in accordance with an example embodiment of the invention as used to scan a photographic negative or other unmounted film original.

FIG. 8 shows a transparent media adapter in accordance with an example embodiment of the invention as used to scan a photographic negative or other unmounted film original. Photographic negatives resulting from 35 millimeter film photography are often simply strips of film with four to six photographic frames included. Other photographic formats may result in film originals of various sizes. By laying an unmounted film original 801 on top of fiber optic face plate 803, the example transparent media adapter allows a scanner to scan an unmounted film original. Unmounted film originals, like slides, often have curvature. The user may wish to place unmounted film original 801 onto the transparent media adapter with its concave side toward fiber optic face plate 803 in order to minimize the opportunity for damage to original 801. If the curvature of unmounted film original 801 is excessive, it may be desirable to provide means for constraining unmounted film original 801 in close proximity to fiber optic face plate 803 in order to facilitate the capture of a high resolution image by fiber optic face plate 803.

In addition, reference surfaces 802 may be provided, substantially coplanar with the top surface of fiber optic face plate 803, for supporting unmounted film original 801 by its edges. This further reduces the danger of damage to film original 801, and also allows fiber optic face plate 803 to be only as large as is needed to scan the image area of original 801, thereby minimizing the cost of fiber optic face plate

803. The length and width of fiber optic face plate 803 may be tailored to the size of unmounted film originals that are to be scanned with the transparent media adapter.

Figure 9A:
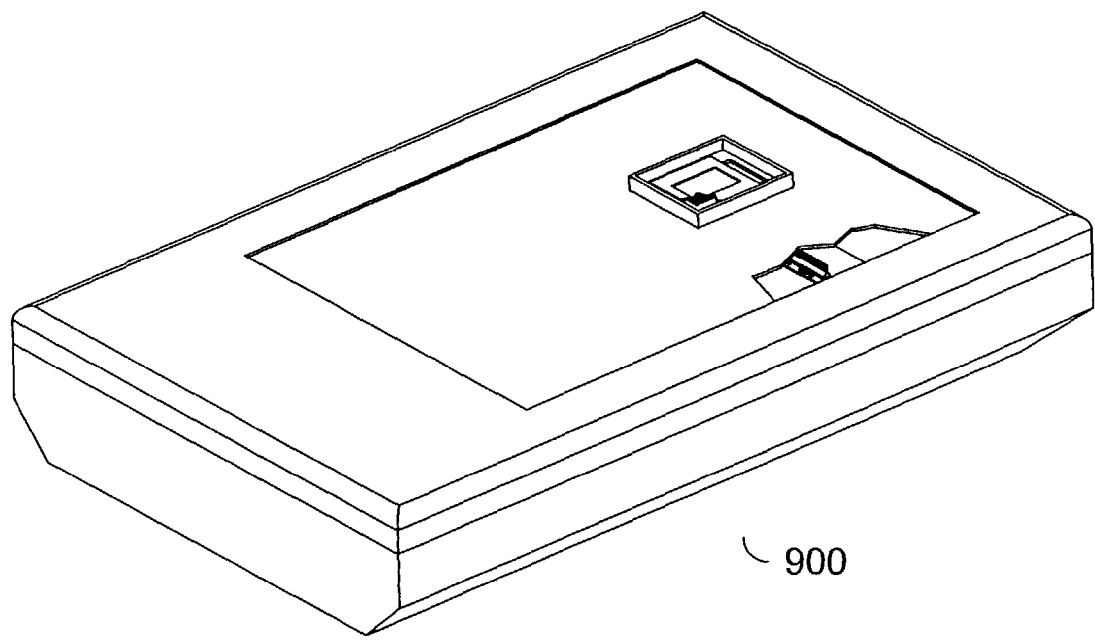
FIG. 9A depicts a scanner transparent media adapter in accordance with an example embodiment of the invention, comprising a calibration area, and placed on a scanner.
Figure 9B:
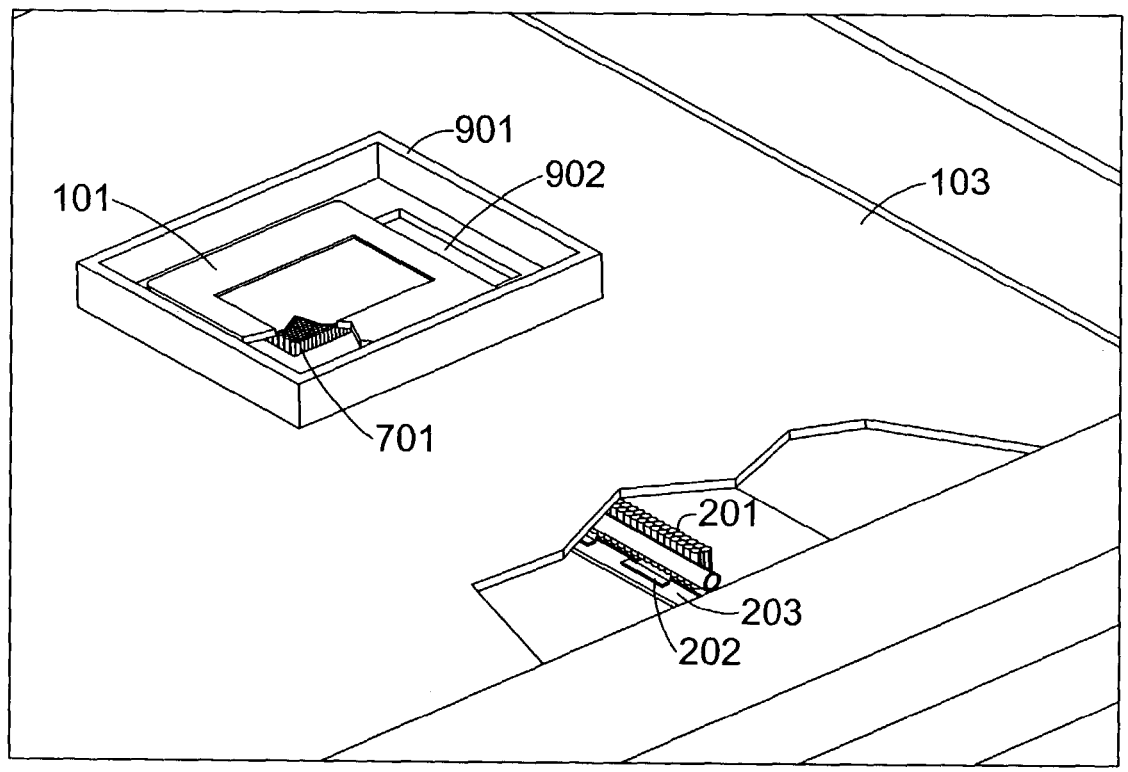
FIG. 9B depicts a close-up view of the transparent media adapter of FIG. 9A.

FIGS. 9A and 9B depict a scanner transparent media adapter in accordance with an example embodiment of the invention, comprising a calibration area. Each of light sensitive elements 202 typically comprises a plurality of individual pixels. A pixel in this context is an individually-addressable light-sensing area of a size that defines the resolution of the scanner. For example, a scanner may sample originals placed on it at a resolution of 1200 pixels per inch. The apparent sensitivity of the pixels may vary with respect to one another. That is, when illuminated uniformly, different pixels on light sensitive elements 202 may indicate slightly different brightness levels. This effect is sometimes called photo response nonuniformity (PRNU). Other optical or illumination effects may also cause apparent variation in the sensitivity of pixels. This variation causes incorrect scans, but may often be compensated by performing a calibration.

In calibrating for pixel variation, an original of uniform brightness is scanned. Because the original is known to be uniform, any variability in the readings from different scanner pixels is attributed to PRNU or other optical or illumination effects. Compensating factors are computed for each pixel, and applied during a later scan to remove the effects of the variation.

In order to accommodate calibration, a scanner transparent media adapter in accordance with the invention may include a calibration area, as shown in FIGS. 9A and 9B. FIG. 9A depicts a scanner transparent media adapter in accordance with an example embodiment of the invention, comprising a calibration area, and placed on a scanner 900. FIG. 9B depicts a close-up view of the transparent media adapter of FIG. 9A. Support structure 901 rests on the scanner platen 103, and positions fiber optic face plate 701 on the platen. Slide 101 rests on fiber optic face plate 701. Support structure 901 may also hold a light source above slide 101, but the light source is omitted from the figure for clarity. Support structure 901 may include calibration area 902. Calibration area 902 is an opening that allows the scanner imaging module to view the light source directly. The light source is large enough to cover the calibration area as well as slide 101. By positioning the scanner imaging module under calibration area 902, the light source may be scanned directly. Thus the "original" of uniform brightness that is being scanned is the air between the platen 103 and the light source. Differences in pixel brightness may be attributed to PRNU, nonuniformity of the light source itself, or other optical effects, and appropriate corrections may be applied when slide 101 is scanned.

Calibration area 902 may include a fiber optic face plate as well, in order to facilitate calibration of any nonuniformity introduced by fiber optic face plate 701. Other arrangements may be easily envisioned that allow calibration when a transparent media adapter in accordance with the invention is used to scan negatives or other unmounted film originals.

The foregoing description of the present invention has been presented for purposes of illustration and description. It is not intended to be exhaustive or to limit the invention to the precise form disclosed, and other modifications and variations may be possible in light of the above teachings. For example, a transparent media adapter and scanner could be envisioned wherein the components are in some other orientation than the vertical stack arrangement described. A scanner platen may be vertical, and a light source, transmissive original, and fiber optic face plate may be arranged horizontally. Other embodiments may be envisioned as well. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A system, comprising:
   a) a scanner, comprising
      i. an optical system;
      ii. a platen; and
      iii. a focal plane of the optical system substantially at a surface of the platen; and
   b) a transparent media adapter, comprising
      i. a fiber optic face plate;
      ii. an exit face of the fiber optic face plate, the exit face positioned substantially at the focal plane of the optical system of the scanner;
      iii. an entrance face of the fiber optic face plate, substantially opposite the exit face; and
         wherein the entrance face receives light passing through a transmissive original, and the fiber optic face plate transmits an image of the transmissive original from the entrance face to the exit face.

2. The system of claim 1 wherein the optical system includes a contact image sensor module.

3. The system of claim 1, further comprising a light source.

4. The system of claim 3 wherein the light source is in the scanner transparent media adapter.

5. The system of claim 3 wherein the light source emanates substantially uniform diffuse light.

6. A method of scanning a transmissive original, comprising the steps of:
   placing the transmissive original in substantial contact with an entrance face of a fiber optic face plate;
   placing an exit face of the fiber optic face plate substantially at the focal plane of a scanner;
   directing light through the transmissive original and into the entrance face of the fiber optic face plate; and
   scanning an image of the transmissive original, which image emerges from the exit face of the fiber optic face plate;
   and wherein placing the exit face of the fiber optic face plate substantially at the focal plane of the scanner comprises placing the exit face of the fiber optic face plate on a platen of the scanner.

7. A method of scanning a transmissive original, comprising the steps of:
   placing the transmissive original in substantial contact with an entrance face of a fiber optic face plate;
   placing an exit face of the fiber optic face plate substantially at the focal plane of a scanner;
   directing light through the transmissive original and into the entrance face of the fiber optic face plate;
   scanning an image of the transmissive original, which image emerges from the exit face of the fiber optic face plate;
   scanning a source of the light;
   computing calibration factors to be applied to pixels in the scanned image of the transmissive original; and
   correcting for photo response nonuniformity by applying the calibration factors to pixels in the scanned image of the transmissive original.

\* \* \* \* \*